United States Patent
Kasuya

(10) Patent No.: US 11,836,879 B2
(45) Date of Patent: Dec. 5, 2023

(54) INFORMATION PROCESSING APPARATUS, INFORMATION PROCESSING METHOD, AND STORAGE MEDIUM FOR CORRECTING A SHIFT BETWEEN THREE-DIMENSIONAL POSITIONS

(71) Applicant: CANON KABUSHIKI KAISHA, Tokyo (JP)

(72) Inventor: Nozomu Kasuya, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 226 days.

(21) Appl. No.: 17/166,681

(22) Filed: Feb. 3, 2021

(65) Prior Publication Data

US 2021/0241541 A1 Aug. 5, 2021

(30) Foreign Application Priority Data

Feb. 5, 2020 (JP) ................................. 2020-018275

(51) Int. Cl.
*G06T 19/20* (2011.01)
*G06T 7/73* (2017.01)
(Continued)

(52) U.S. Cl.
CPC .............. *G06T 19/20* (2013.01); *G06T 7/593* (2017.01); *G06T 7/73* (2017.01); *H04N 13/111* (2018.05); *H04N 13/282* (2018.05); *H04N 23/683* (2023.01); *G06T 2200/08* (2013.01); *G06T 2207/10012* (2013.01); *G06T 2219/2016* (2013.01); *G06T 2219/2021* (2013.01)

(58) Field of Classification Search
None
See application file for complete search history.

(56) References Cited

U.S. PATENT DOCUMENTS

| 8,401,276 B1* | 3/2013 | Choe | G01C 11/06 382/285 |
| 2013/0135439 A1* | 5/2013 | Kakuko | H04N 13/00 348/46 |

(Continued)

FOREIGN PATENT DOCUMENTS

| JP | 2002260017 A | * 9/2002 |
| JP | 2003-179800 A | 6/2003 |

(Continued)

OTHER PUBLICATIONS

Chris Hermans et al: "Extrinsic Recalibration in Camera Networks", Fourth Canadian Conference on Computer and Robot Vision, CRV 2007, IEEE, PI, May 1, 2007, pp. 3-10, XP31175782, ISBN: 978-0-7695-2786-4.

(Continued)

*Primary Examiner* — Steven Z Elbinger
(74) *Attorney, Agent, or Firm* — CANON U.S.A., INC. IP Division

(57) ABSTRACT

An information processing apparatus for correcting a shift between a first three-dimensional position in an image capturing region that is identified based on a position of a first feature point on a first image and a second three-dimensional position in an image capturing region that is identified based on a position of a second feature point corresponding to the first feature point on a second image.

20 Claims, 8 Drawing Sheets

(51) Int. Cl.
G06T 7/593 (2017.01)
H04N 13/111 (2018.01)
H04N 13/282 (2018.01)
H04N 23/68 (2023.01)

(56) References Cited

U.S. PATENT DOCUMENTS

| | | | |
|---|---|---|---|
| 2016/0247288 A1* | 8/2016 | Omori | H04N 1/3871 |
| 2017/0094259 A1* | 3/2017 | Kouperman | H04N 13/111 |
| 2019/0333269 A1* | 10/2019 | Matsunobu | G06T 17/05 |
| 2021/0392317 A1* | 12/2021 | Armatorio | H04N 13/239 |
| 2022/0159183 A1* | 5/2022 | Li | H04N 5/232933 |

FOREIGN PATENT DOCUMENTS

| | | | | |
|---|---|---|---|---|
| JP | 2017-069920 A | 4/2017 | | |
| WO | WO-2013027343 A1 * | 2/2013 | | G02B 7/02 |
| WO | WO-2014181581 A1 * | 11/2014 | | G06T 7/85 |

OTHER PUBLICATIONS

Assaf Zomet A et al: "Omni-rig: linear self-recalibration of a rig with varying internal and external parameters", Proceedings of the Eight IEEE International Conference On Computer Vision. (ICCV). Vancouver, British Columbia, Canada, Jul. 7-14, 2001, Los Alamitos, CA : IEEE Comp. Soc, US, vol. 1, Jul. 7, 2001, pp. 135-141, XP10553973, ISBN: 978-0-7695-1143-6.

* cited by examiner

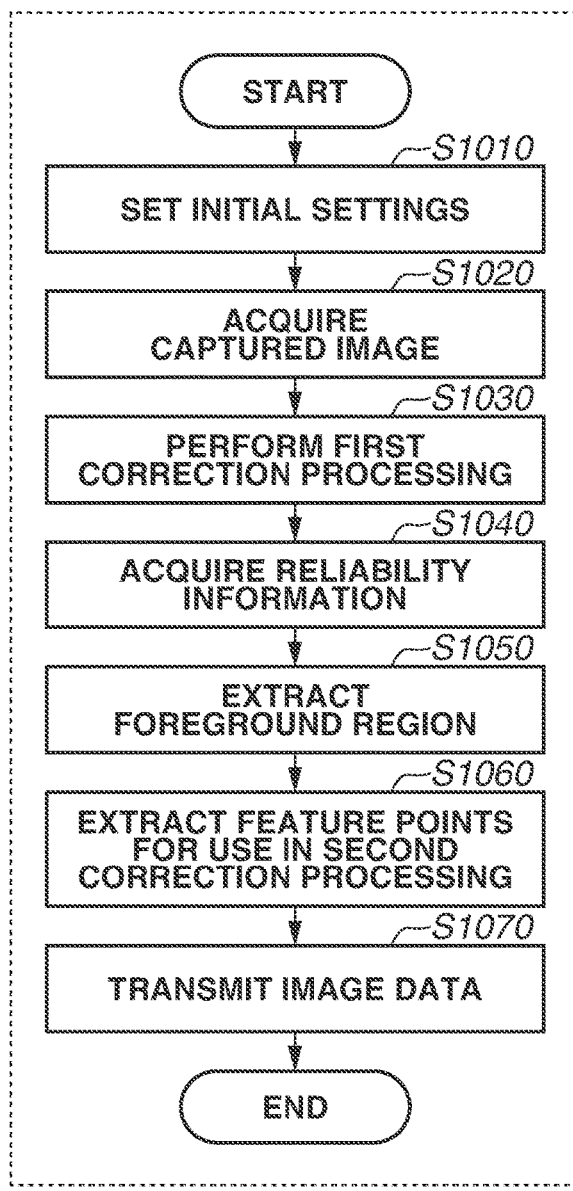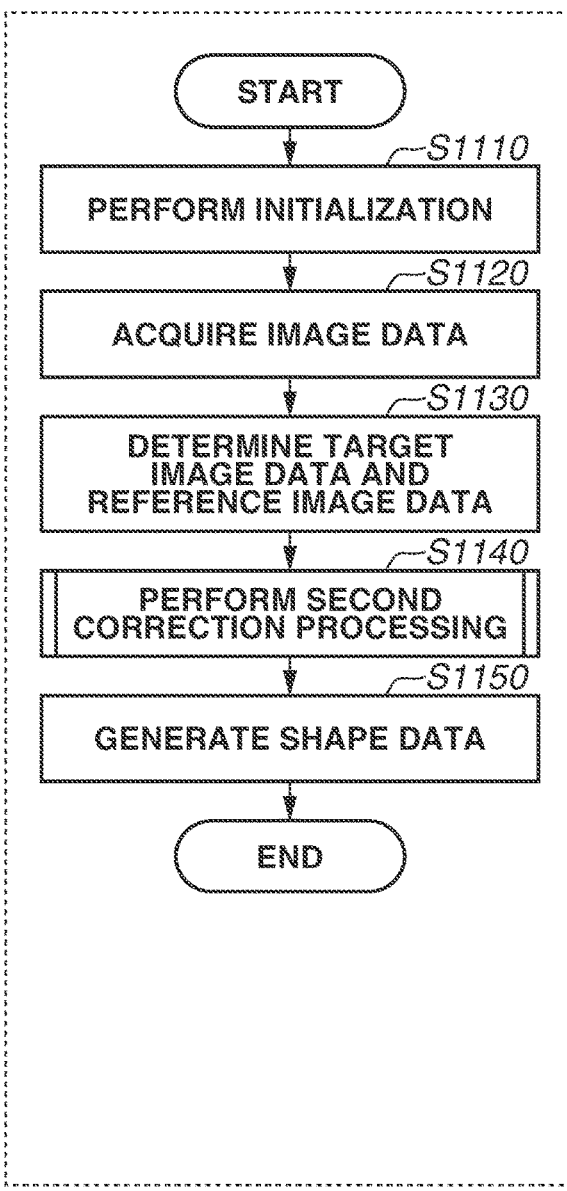

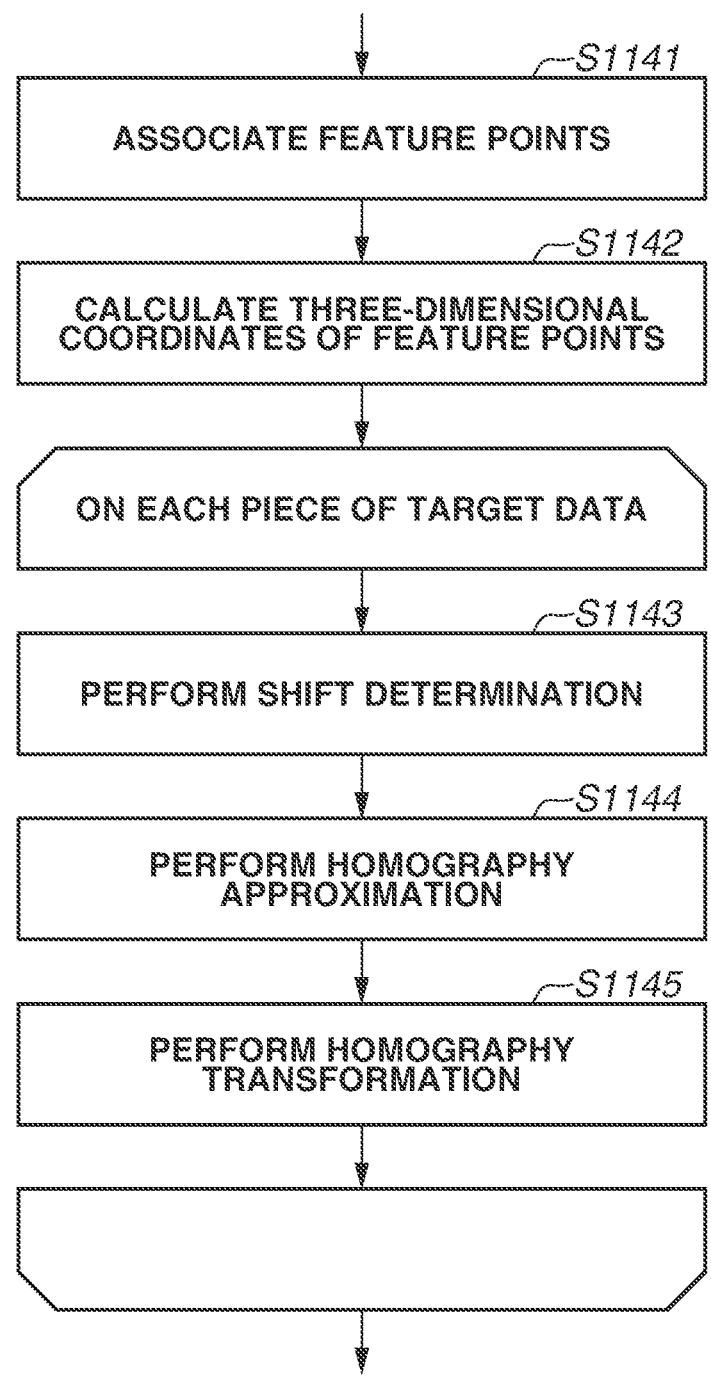

INFORMATION PROCESSING APPARATUS, INFORMATION PROCESSING METHOD, AND STORAGE MEDIUM FOR CORRECTING A SHIFT BETWEEN THREE-DIMENSIONAL POSITIONS

BACKGROUND

Field

The present disclosure relates to information processing apparatuses, information processing methods, and a storage medium.

Description of the Related Art

In recent years, techniques for generating various types of image content using a plurality of captured images acquired by a plurality of image capturing apparatuses have drawn attention. Examples of image content include virtual point-of-view images and panoramic images. Further, techniques for generating image content based on a plurality of captured images are expected to be used in analyzing orientations and movements of subjects (e.g., athletes) and in making judgements in sports.

For example, in a case where a virtual point-of-view image is to be generated, a plurality of image capturing apparatuses is arranged around an image capturing region and captures images, and an image (virtual point-of-view image) from a designated point of view (virtual point of view) is generated based on the plurality of captured images acquired from the image capturing apparatuses. In this operation, subject shape data for displaying the virtual point-of-view image is generated using the plurality of captured images and information indicating a state of the plurality of image capturing apparatuses, such as positions, orientations, and focal lengths of the plurality of image capturing apparatuses that are preset. However, the image capturing apparatuses may be shaken or lens positions and characteristics may be changed while image capturing is performed, and this may cause a change in the positions, orientations, and focal lengths of the image capturing apparatuses. In other words, the state of the image capturing apparatuses changes. In such a case, if the change in the state of the image capturing apparatuses is not taken into account in generating shape data, the accuracy of generated shape data decreases and, consequently, the quality (image quality) of the virtual point-of-view image decreases. Thus, a change in the state of the image capturing apparatuses may affect the quality of generated image content.

Japanese Patent Laid-Open No. 2017-69920 discusses a method of reducing an effect of a change in a state of image capturing apparatuses that is caused by a shake of the image capturing apparatuses. Japanese Patent Laid-Open No. 2017-69920 discusses a method of correcting a shift in a captured image which is due to a shake of a plurality of image capturing apparatuses attached to the same base by using the situation that the plurality of image capturing apparatuses receives the same shake.

According to the technique discussed in Japanese Patent Laid-Open No. 2017-69920, however, the correction may not be performed as appropriate in a case where the plurality of image capturing apparatuses each receives a different shake.

SUMMARY

According to one aspect of the present invention, there is provided an information processing apparatus comprising: a first acquisition unit configured to acquire a plurality of images to be used in generating image content based on capturing an image of an image capturing region at a predetermined time point from different directions by a plurality of image capturing apparatuses; a second acquisition unit configured to acquire a plurality of pieces of image capturing information including information from which at least one of a position and an orientation of the plurality of image capturing apparatuses corresponding to the plurality of images acquired by the first acquisition unit is to be identified; and a correction unit configured to correct a shift between a first three-dimensional position in the image capturing region that is identified based on a position of a first feature point on a first image among the plurality of images acquired by the first acquisition unit and the image capturing information about the image capturing apparatus that corresponds to the first image and a second three-dimensional position in the image capturing region that is identified based on a position of a second feature point corresponding to the first feature point on a second image among the plurality of images acquired by the first acquisition unit and the image capturing information about the image capturing apparatus that corresponds to the second image.

Further features of the present invention will become apparent from the following description of exemplary embodiments with reference to the attached drawings.

BRIEF DESCRIPTION OF THE DRAWINGS

FIGS. 4A and 4B are flowcharts illustrating processes that are executed by the image processing apparatus and the front end server.

FIG. 5 is a flowchart illustrating details of a second correction process.

DESCRIPTION OF THE EMBODIMENTS

Figure 1:
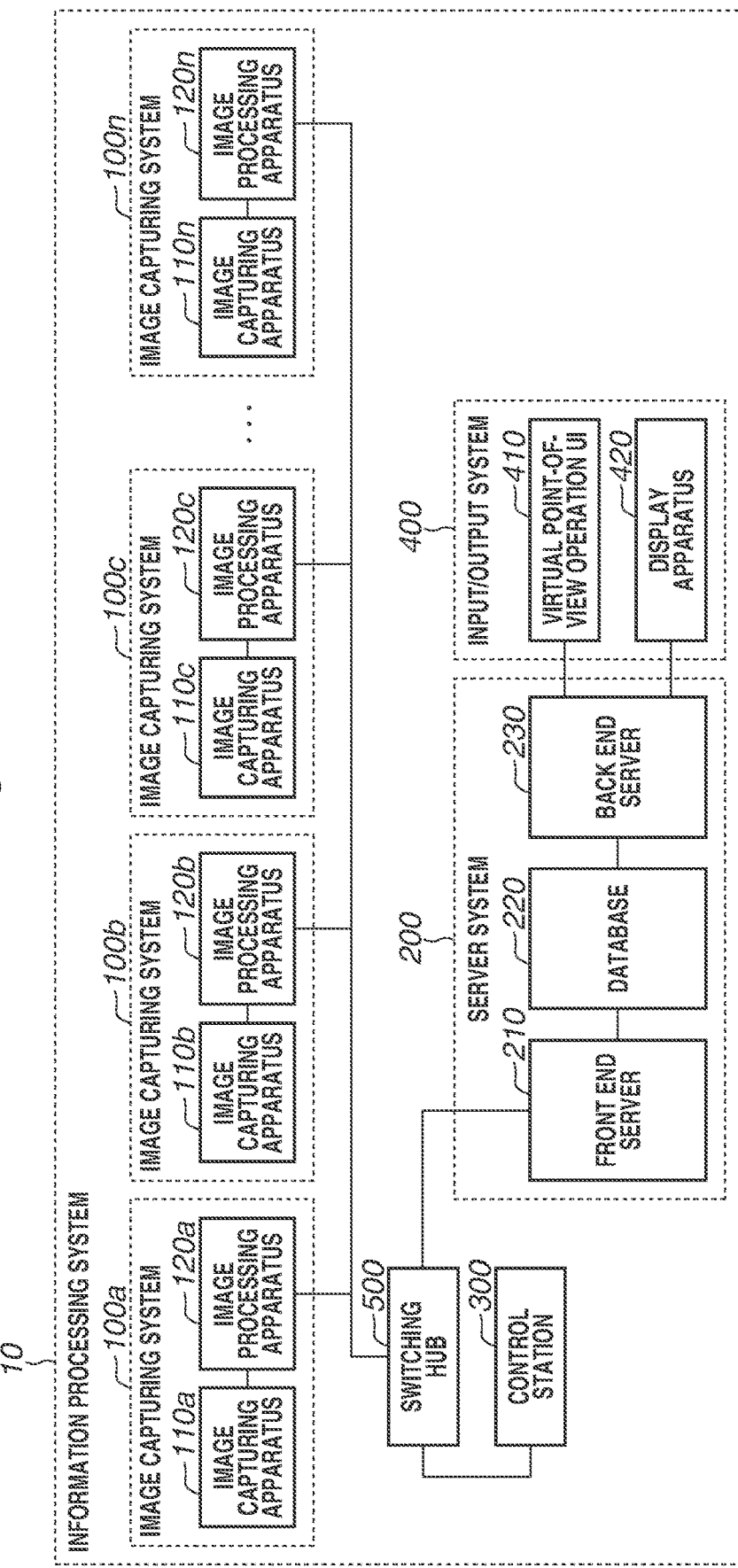
FIG. 1 is a diagram illustrating a configuration of an information processing system.

Various exemplary embodiments of the present invention will be described below with reference to the drawings. It should be noted that each component described in the exemplary embodiments below merely illustrates an example of an exemplary embodiment of the present invention and that the present disclosure is not limited to the illustrated examples.

First Exemplary Embodiment

In the present exemplary embodiment, an information processing system that performs processing to generate virtual point-of-view images will be described below as an example of a system including a plurality of image capturing apparatuses. The term "virtual point-of-view image" refers to an image of a view captured from a designated virtual point of view based on a plurality of images captured by the plurality of image capturing apparatuses and the designated point of view (virtual point of view). Further, a virtual point-of-view image in the present exemplary embodiment is also referred to as a free point-of-view image and is not limited to an image that corresponds to a point of view designated freely (as desired) by a user and, for example, an image that corresponds to a point of view selected from a plurality of candidates by a user is also an example of a virtual point-of-view image. A virtual point-of-view image in the present exemplary embodiment can be either one of a still image and a moving image. Image data that is used in the information processing system can be either one of a still image and a moving image. In other words, the information processing system according to the present exemplary embodiment can process both still images and moving images.

A hardware configuration of each apparatus included in the information processing system according to the present exemplary embodiment will be described below with reference to FIG. 7. A front end server 210 in FIG. 7 includes a central processing unit (CPU) 701, a read-only memory (ROM) 702, a random access memory (RAM) 703, an auxiliary storage apparatus 704, a display unit 705, an operation unit 706, a communication interface (communication I/F) 707, and a bus 708. An image processing apparatus, a control station, and a back end server that will be described below also have a hardware configuration including at least one of a CPU, a ROM, a RAM, an auxiliary storage apparatus, a display unit, an operation unit, a communication I/F, and a bus. As an example, a feature of each component of the front end server 210 will be described below.

The CPU 701 controls the entire front end server 210 using a computer program and data stored on the ROM 702 and/or the RAM 703 to realize a function of a processing unit included in the front end server 210. The front end server 210 can include a single piece or plurality of pieces of dedicated hardware different from the CPU 701, and the dedicated hardware can execute at least part of the processing of the CPU 701. Examples of dedicated hardware include an application-specific integrated circuit (ASIC), a field-programmable gate array (FPGA), and a digital signal processor (DSP). The ROM 702 stores programs that do not need changes. The RAM 703 temporarily stores programs and data supplied from the auxiliary storage apparatus 704 and data supplied externally via the communication I/F 707. The auxiliary storage apparatus 704 includes, for example, a hard disk drive and stores various types of data, such as image data and audio data.

The display unit 705 includes, for example, a liquid crystal display and a light emitting diode (LED) and displays a graphical user interface (GUI) that is used by a user to operate the front end server 210. The operation unit 706 includes, for example, a keyboard, a mouse, a joystick, and a touch panel and inputs various instructions to the CPU 701 based on received user operations. The CPU 701 operates as a display control unit that controls the display unit 705 and as an operation control unit that controls the operation unit 706.

The communication I/F 707 is used to communicate with an external apparatus provided outside the front end server 210. For example, in a case where the front end server 210 is connected to an external apparatus via wire, a cable for communication is connected to the communication I/F 707. In a case where the front end server 210 includes a function of wirelessly communicating with an external apparatus, the communication I/F 707 includes an antenna. The bus 708 connects the components of the front end server 210 together and transmits information.

Figure 7:
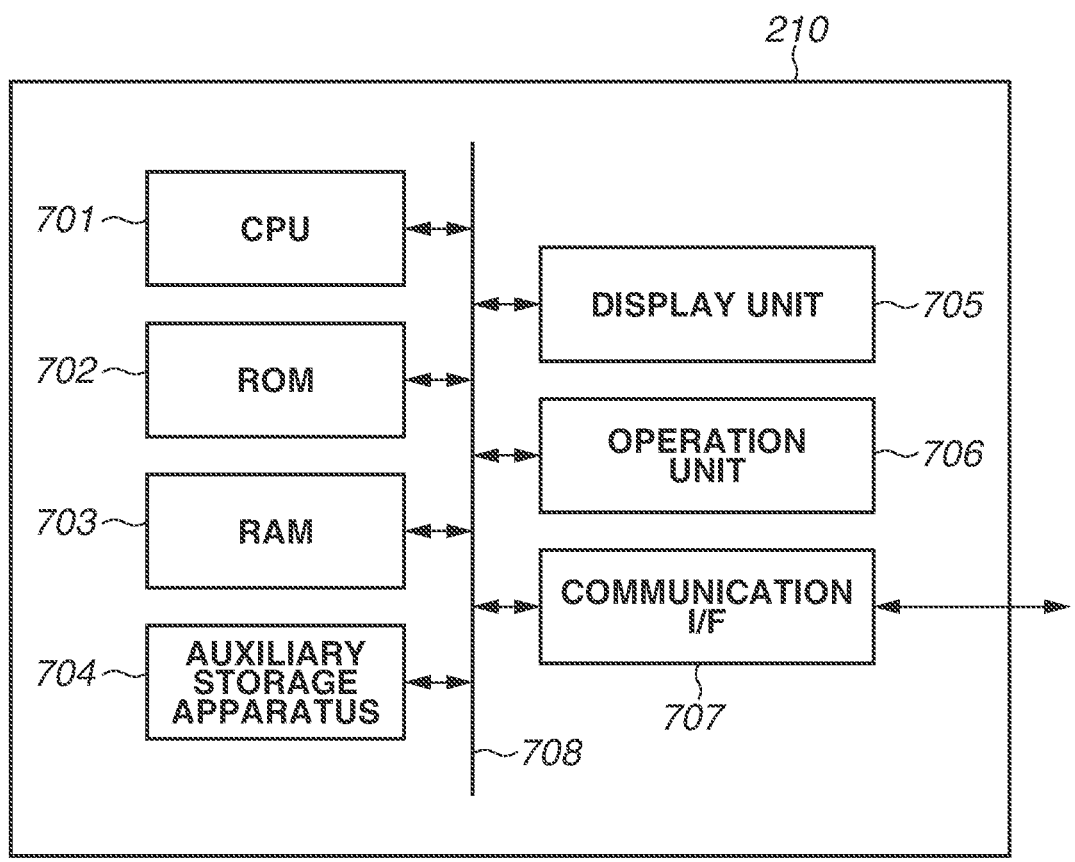
FIG. 7 is a diagram illustrating a hardware configuration of a front end server of the information processing system.

While the display unit 705 and the operation unit 706 are in the front end server 210 in FIG. 7, this is not a limiting configuration. At least one of the display unit 705 and the operation unit 706 can be a separate apparatus disposed outside the front end server 210. Further, one or both of the display unit 705 and the operation unit 706 can be not included. This also applies to an image processing apparatus, a control station, and a back end server that will be described below. In below-described exemplary embodiments, a display apparatus and a virtual point-of-view operation user interface (virtual point-of-view operation UI) described below respectively correspond to the display unit 705 and the operation unit 706 that are externally connected to the front end server 210.

Next, a configuration of the information processing system according to the present exemplary embodiment will be described below. FIG. 1 illustrates a configuration of an information processing system 10. The information processing system 10 includes a plurality of image capturing systems 100a to 110n, a server system 200, a control station 300, an input/output system 400, and a switching hub 500. Each component will be described below.

The image capturing system 100a includes an image capturing apparatus 110a and an image processing apparatus 120a. Similarly, the image capturing systems 100b to 100n respectively include image capturing apparatuses 110b to 110n and image processing apparatuses 120b to 120n. Hereinafter, unless otherwise specified, the image capturing systems 100a to 100n and the image capturing apparatuses 110a to 110n and the image processing apparatuses 120a to 120n of the image capturing systems 100a to 110n will not be discriminated and will be referred to simply as the image capturing system 100, the image capturing apparatus 110, and the image processing apparatus 120. Further, the number of image capturing systems 100 is two or more.

Figure 8:
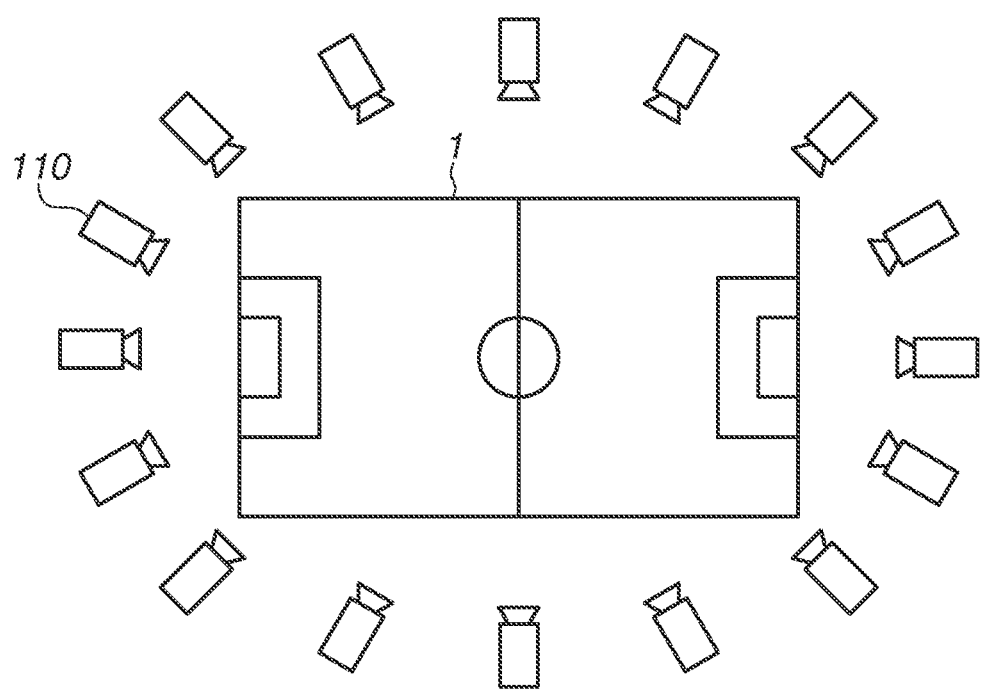
FIG. 8 is a diagram illustrating an example of an arrangement of a plurality of image capturing apparatuses.

The plurality of image capturing apparatuses 110 receives an image capturing instruction transmitted from the control station 300 via the switching hub 500 and captures images at synchronized image capturing timings. An example of an arrangement of the plurality of image capturing apparatuses 110 will be described below with reference to FIG. 8. As illustrated in FIG. 8, the plurality of image capturing apparatuses 110 are arranged to surround an image capturing region 1 and captures images of the image capturing region 1 from different directions. The image capturing region 1 is, for example, a stadium where games of soccer, karate or the like are played, or a stage where concerts and plays are performed. The plurality of image capturing apparatuses 110 does not have to be disposed around the entire perimeter of the image capturing region 1, and depending on installation site restrictions, the plurality of image capturing apparatuses 110 can be installed only at predetermined positions. The plurality of image capturing apparatuses 110 does not have to be fixed to the same base and, for example, each image capturing apparatus 110 can be fixed to a different pillar.

The number of image capturing apparatuses 110 is not limited to the example illustrated in FIG. 8, and in a case where, for example, the image capturing region 1 is a soccer stadium, about thirty image capturing apparatuses 110 can be installed around the stadium. The image capturing apparatuses 110 of different functions, such as telephoto cameras and wide-angle cameras, can be also installed. The plurality of image capturing apparatuses 110 transmits captured images of the image capturing region 1 to the respective image processing apparatuses 120.

The image processing apparatus 120 acquires captured images from the image capturing apparatus 110 connected to image processing apparatus 120 and performs predetermined image processing on the acquired captured images. Details of the image processing performed by the image processing apparatus 120 will be described below. The image processing apparatus 120 transmits image data acquired by performing the image processing to the server system 200 via the switching hub 500.

The server system 200 includes the front end server 210, a database 220, and a back end server 230. The front end server 210 performs predetermined image processing to generate a virtual point-of-view video image based on the image data transmitted from the image capturing system 100. Details of the image processing performed by the front end server 210 will be described below. The front end server 210 performs the predetermined image processing to generate image data, such as shape data representing the shape of a subject (e.g., a person or ball in the image capturing region 1) and texture data representing colors of the shape data. The front end server 210 stores the generated image data on the database 220.

The back end server 230 acquires inputs to a virtual point-of-view operation user interface (virtual point-of-view operation UI) 410 of the input/output system 400. The virtual point-of-view operation UI 410 provides a user interface (UI) for operations of designating a virtual point of view. A user can designate a point-of-view position of a virtual point of view and a line-of-sight direction by operating the virtual point-of-view operation UI 410. The inputs received by the virtual point-of-view operation UI 410 are transmitted as virtual point-of-view information containing a parameter indicating the point-of-view position of the virtual point of view and a parameter indicating the line-of-sight direction from the virtual point of view to the back end server 230. The back end server 230 acquires the virtual point-of-view information transmitted from the virtual point-of-view operation UI 410 and acquires image data for generating a virtual point-of-view image corresponding to the virtual point-of-view designated based on the acquired virtual point-of-view information from the database 220. The back end server 230 performs rendering processing using the acquired image data to generate a virtual point-of-view image. The generated virtual point-of-view image is transmitted to a display apparatus 420 of the input/output system 400 and displayed. While, in the present exemplary embodiment, the virtual point-of-view information acquired based on the operation of designating the virtual point of view contains the parameter indicating the point-of-view position of the virtual point of view and the parameter indicating the line-of-sight direction from the virtual point of view, information contained in the virtual point-of-view information is not limited to those described above. For example, information about an angle of view of the virtual point of view can be contained. Further, at least one of the point-of-view position of the virtual point of view, the line-of-sight direction from the virtual point of view, and the angle of view of the virtual point of view can be contained in the virtual point-of-view information.

The configuration of the server system 200 is not limited to the configuration illustrated in FIG. 1. For example, at least two of the front end server 210, the database 220, and the back end server 230 can be integrated together. The image processing apparatus 120 or the input/output system 400 can include at least part of the functions of the server system 200.

The control station 300 is connected to the image capturing system 100 and the server system 200 via the switching hub 500. The control station 300 manages the image capturing system 100 and the server system 200 and controls image capturing. The control station 300 also controls the plurality of image capturing apparatuses 110 to perform calibration processing to acquire an image capturing parameter that indicates a state of the plurality of image capturing apparatuses 110. As used herein, the term "image capturing parameter" refers to image capturing information including information about a position, an orientation, a focal length of a lens, and a lens distortion. The image capturing parameter does not have to include information about every one of the position, the orientation, the focal length of the lens, and the lens distortion and is to include at least one of the position and the orientation. Information other than those described above can further be contained.

Figure 2:
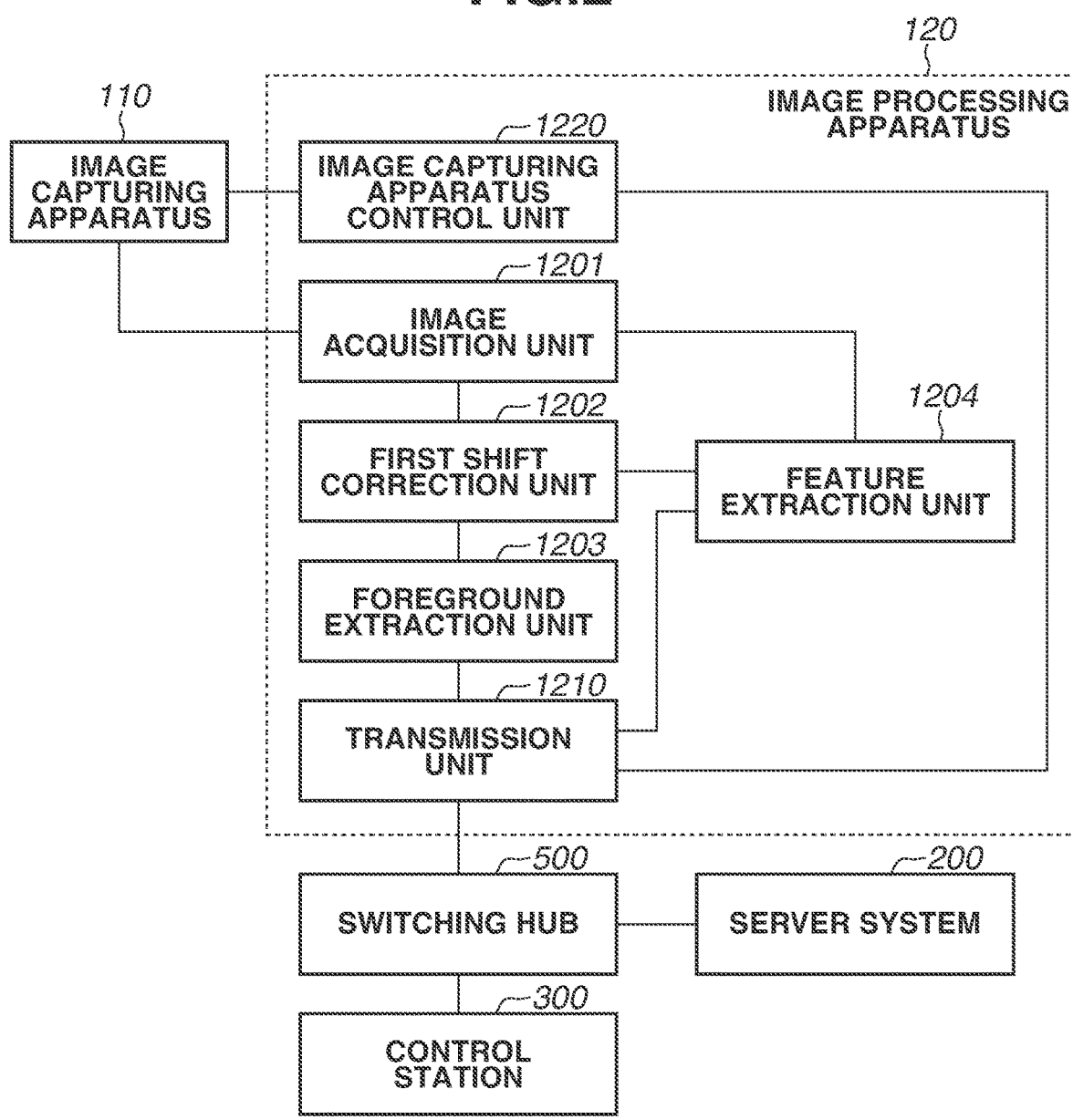
FIG. 2 is a diagram illustrating a functional configuration of an image processing apparatus.

Next, a functional configuration of the image processing apparatus 120 of the information processing system 10 will be described below with reference to FIG. 2. The image processing apparatus 120 includes an image acquisition unit 1201, a first shift correction unit 1202, a foreground extraction unit 1203, a feature extraction unit 1204, a transmission unit 1210, and an image capturing apparatus control unit 1220. The transmission unit 1210 is connected to the switching hub 500 and communicates with external apparatuses, such as the control station 300 and the server system 200, via the switching hub 500.

In a case where image capturing instruction information is transmitted from the control station 300, the image capturing apparatus control unit 1220 acquires the information via the transmission unit 1210 and controls the image capturing apparatus 110 based on the acquired information. The image capturing apparatus 110 captures an image of the image capturing region 1 under control by the image capturing apparatus control unit 1220 and transmits the captured image to the image acquisition unit 1201. The image capturing apparatus control unit 1220 causes the image capturing apparatus 110 to perform calibration processing based on the instruction from the control station 300 and acquires the image capturing parameter of the image capturing apparatus 110. The image capturing apparatus control unit 1220 transmits the acquired image capturing parameter to the transmission unit 1210. In this operation, the image capturing parameter with an image capturing apparatus identification (image capturing apparatus ID) associated is transmitted. By the image capturing apparatus ID, the image capturing apparatus 110 that corresponds to the image capturing parameter among the plurality of image capturing apparatuses 110 is identified. The image acquisition unit 1201 acquires the captured image transmitted from the image capturing apparatus 110 and transmits the acquired image to the first shift correction unit 1202 and the feature extraction unit 1204.

The first shift correction unit 1202, the foreground extraction unit 1203, and the feature extraction unit 1204 perform predetermined image processing on the captured image acquired by the image acquisition unit 1201 to acquire image data based on the captured image. Details of the image processing performed by each processing unit will be described below.

The feature extraction unit 1204 extracts one or more feature points from the captured image transmitted from the image acquisition unit 1201. For example, in a case where an image of a soccer field is captured, an intersection point of a field line or an end point of the field are extracted as a feature point. A feature point to be extracted, however, is not limited to those described above. For example, something in the form of a line, such as a field line, can be extracted, or a region having an area can be extracted. A feature point can be a patch of a predetermined magnitude (e.g., 3×3 pixels). Specifically, the feature extraction unit 1204 extracts a local feature, such as a point, line, or region having a predetermined feature. While, in the present exemplary embodiment, the example in which a feature point is extracted as a local feature is described, the present exemplary embodiment is also applicable to a case where a local feature, such as a line or region, is extracted.

As the feature points extracted by the feature extraction unit 1204 include a greater number of feature points based on an object that remains unchanged in position at different time points, the accuracy of the processing performed by the first shift correction unit 1202 that will be described below is expected to increase. The feature extraction unit 1204 transmits information indicating the position of each extracted feature point (hereinafter, the information will be referred to as "feature point position information") and feature information including information indicating the feature of the feature point to the first shift correction unit 1202. The feature point position information indicates, for example, two-dimensional coordinates of the feature point on the image. In a case where a region and a patch that have a predetermined feature are extracted, for example, two-dimensional coordinates of a representative point of the region and the patch are transmitted as the position information. Further, the feature information contains information based on pixels corresponding to the feature point on the captured image and pixels neighboring the pixels.

The feature extraction unit 1204 also extracts a plurality of feature points from the image data transmitted from the first shift correction unit 1202 that will be described below. The extracted feature points are used in image processing performed by the front end server 210 that will be described below. Information to be acquired and an extraction method are similar to those in the method described above, except that a feature point to be extracted in this operation can be a feature point based on an object that moves (changes in position) in the image capturing region 1. The feature extraction unit 1204 transmits feature point position information about each extracted feature point and feature information about the feature point to the transmission unit 1210.

The first shift correction unit 1202 performs correction processing (hereinafter, "first correction processing") to correct the captured image transmitted from the image acquisition unit 1201. In a case where the image capturing apparatus 110 performs image capturing a plurality of times, for example, the image capturing apparatus 110 may be shaken by wind or an impact on the installation site, or the lens in the image capturing apparatus 110 may be changed in position or characteristics due to a temperature change. A change in the state of the image capturing apparatus 110 as described above may cause a shift between captured images acquired by the plurality of times of image capturing. Examples of a shift caused by a change in the state of the image capturing apparatus 110 include a shift in image capturing position that is caused by a change in position of the image capturing apparatus 110, a shift in image capturing direction that is caused by a change in orientation of the image capturing apparatus 110, and a zoom shift that is an enlargement/reduction during image capturing due to a change in position or characteristics of the lens. The first shift correction unit 1202 performs processing to correct the shifts based on the plurality of captured images acquired by performing image capturing at a plurality of different time points.

The first correction processing performed by the first shift correction unit 1202 will be described below. The first shift correction unit 1202 acquires a captured image acquired by image capturing at a predetermined time point from the image acquisition unit 1201. In this operation, the captured image is also transmitted to the feature extraction unit 1204.

The first shift correction unit 1202 performs the first correction processing on the captured image acquired from the image acquisition unit 1201 based on the feature point position information and the feature information that are transmitted from the feature extraction unit 1204. In this operation, the first shift correction unit 1202 holds in advance another captured image (hereinafter, referred to as "reference captured image") acquired by image capturing at a time point different from the predetermined time point and feature point position information and feature information about a feature point on the reference captured image. The first shift correction unit 1202 searches the reference captured image for a feature point corresponding to a feature point on the captured image acquired from the image acquisition unit 1201. The corresponding feature point is identified by, for example, scanning the captured image and searching for a feature point having the closest feature to the feature indicated by the feature information about the feature point on the reference captured image. Further, the first shift correction unit 1202 can estimate a predetermined region containing the corresponding feature point on the captured image based on the feature point position information about the feature point on the reference captured image and search the estimated region for the feature point without scanning the entire captured image.

The first shift correction unit 1202 determines a shift amount indicating the magnitude of a shift based on a shift of coordinates on the captured image between the feature point on the captured image and the feature point on the reference captured image that corresponds to the feature point on the captured image. The shift amount is represented by a vector indicating a direction in which the feature point is shifted between the captured image and the reference captured image. A method of representing the shift amount is not limited to that described above, and the shift amount can be represented simply by a numerical value. In a case where a plurality of feature points is extracted by the feature extraction unit 1204, a shift amount is determined for each of the plurality of feature points. The first shift correction unit 1202 determines a correction amount for correcting the captured image acquired from the image acquisition unit 1201 based on the determined shift amount and performs the first correction processing based on the correction amount. For example, in a case of a shift in image capturing position, the first correction processing is performed to translate the captured image to reduce the shift amount. In a case of a shift in image capturing direction, the captured image is rotated in at least one of pan, tilt, and roll directions with respect to the image capturing apparatus 110 to reduce the shift amount. In a case of a zoom shift, the captured image is enlarged/reduced to reduce the shift amount. Thus, at least one of an amount of translating the captured image, an amount of rotating the captured image, and an amount of enlarging/reducing the captured image is determined as a correction amount. In a case where shift amounts of a plurality of feature points are determined, for example, the difference between each shift amount and the correction amount is calculated, and a correction amount optimized to minimize the sum of the absolute values of the differences is determined. The first shift correction unit 1202 performs the first correction processing on the captured image based on the determined correction amount and modifies the captured image. As a result of the processing, image data generated by modifying the captured image is acquired.

While, in the present exemplary embodiment, the shift amount determination is performed using the reference captured image held in advance, a specific captured image held in advance does not have to be used. For example, in a case where the image capturing apparatus 110 captures a moving image, the image acquisition unit 1201 acquires moving image frames based on an image capturing frame rate. In this operation, a moving image frame which is a predetermined number of frames before (e.g., one frame before) can be selected as a reference captured image.

In a case where a plurality of types of shifts, such as a shift in image capturing position, a shift in image capturing direction, and a zoom shift, occurs in combination, a plurality of correction methods corresponding to the shifts is performed in combination to correct the image data. In this operation, the types of the shifts that occur do not necessarily have to be identified. For example, the first shift correction unit 1202 calculates a correction amount to minimize the sum of the absolute values of differences between each shift amount of a plurality of feature points and the correction amount in the order of an amount of translation, an amount of rotation, and an amount of enlargement/reduction. Further, the first shift correction unit 1202 performs the first correction processing in the order of translation, rotation, and enlargement/reduction based on the calculated correction amount. With this method, even in a case where a plurality of types of shifts occurs, the first shift correction unit 1202 can still perform correction to reduce the shift amounts. The order of the correction amount calculation and the first correction processing can be any order. Only the processing that is desired among the translation, rotation, and enlargement/reduction can be performed.

The first shift correction unit 1202 acquires reliability information about image data acquired by the first correction processing. The reliability information indicates the reliability of the first correction processing. The reliability information in the present exemplary embodiment refers to information that indicates the accuracy of the first correction processing performed by the first shift correction unit 1202. The reliability information is acquired as described below. For example, in a case where modification is to be performed to translate the captured image, the first shift correction unit 1202 performs optimization calculation to determine a movement amount and direction of the translation to minimize the shift amount of the entire image. A shift amount of each feature point is calculated using the captured image corrected based on the movement amount and direction of the translation that are determined by the calculation and the captured image before the correction. The calculated shift amount corresponds to an error of the first correction processing, so that the accuracy of the first correction processing is higher in a case where the shift amount is small than in a case where the shift amount is great. The first shift correction unit 1202 acquires the value of the shift amount as the reliability of the first correction processing. The first shift correction unit 1202 transmits the image data acquired by performing the first correction processing to the foreground extraction unit 1203 and the feature extraction unit 1204 and transmits the reliability information about the first correction processing to the transmission unit 1210. The reliability information can be information that the smaller the calculated shift amount, the higher the accuracy of the first correction processing, or the reliability information can be information indicating the accuracy level in stages based on the magnitude of a shift amount.

The foreground extraction unit 1203 generates a foreground image that is image data acquired by extracting a foreground region from the image data transmitted from the first shift correction unit 1202. The term "foreground image" refers to an image acquired by extracting an object region (foreground region) from a captured image acquired by image capturing by the image capturing apparatus 110. An object that is extracted as a foreground region refers to a moving object that moves (may change in its absolute position or shape) in a case where image capturing is performed over time from the same direction. Examples of an object are a person, such as a player or a referee in a field where a game is held, a ball in a ball game, and a singer, a player, a performer, or a host in a concert or an entertainment. An example of a method of extracting a foreground region is a method in which an image (background image) corresponding to a region other than a foreground region is generated in advance and a difference between the background image and a captured image is calculated to extract the foreground region. Other examples of a method that can be used in a case of a moving image are a method of extracting a foreground region by calculating a difference between moving image frames and a method of extracting a foreground region using machine learning such as convolutional neural network (CNN). The foreground extraction unit 1203 transmits the foreground image based on the extracted foreground region as image data to the transmission unit 1210.

The transmission unit 1210 transmits the image capturing parameter transmitted from the image capturing apparatus control unit 1220 to the server system 200. The transmission unit 1210 also transmits the reliability information about the first correction processing and the image data that is transmitted from the foreground extraction unit 1203 and contains the foreground image to the server system 200. The transmission unit 1210 also transmits the information containing the feature point position information and the feature information about each feature point that are transmitted from the feature extraction unit 1204 to the server system 200. In this operation, the transmission unit 1210 makes an association between the image capturing parameter, the image data, the reliability information, and the feature point information and performs transmission. As an example of the association, the image capturing apparatus ID similar to the image capturing parameter, the reliability information, and the feature point information are added to the image data as metadata of the image data, and then the image data is transmitted.

A functional configuration of the image processing apparatus 120 is described above. An advantage of performing the first correction processing by the first shift correction unit 1202 in the image processing apparatus 120 is that the accuracy of image processing in the foreground extraction unit 1203 and the front end server 210 described below increases. For example, if a captured image affected by a shift such as a shift in image capturing position, a shift in image capturing direction, and a zoom shift is used when the foreground extraction unit 1203 calculates a difference between a background image and the captured image to extract a foreground region, the difference may not be calculated accurately. This may result in an issue that a foreground image is not extracted as appropriate. However, in a case where the correction processing is performed in advance to reduce the shift amount before the foreground region extraction, the above-described issue is prevented. Further, the accuracy of the foreground region extraction increases every time the background image is updated, and therefore the accuracy of the background region extraction also increases. Consequently, there is another advantage that the quality of a generated background image increases.

Figure 3:
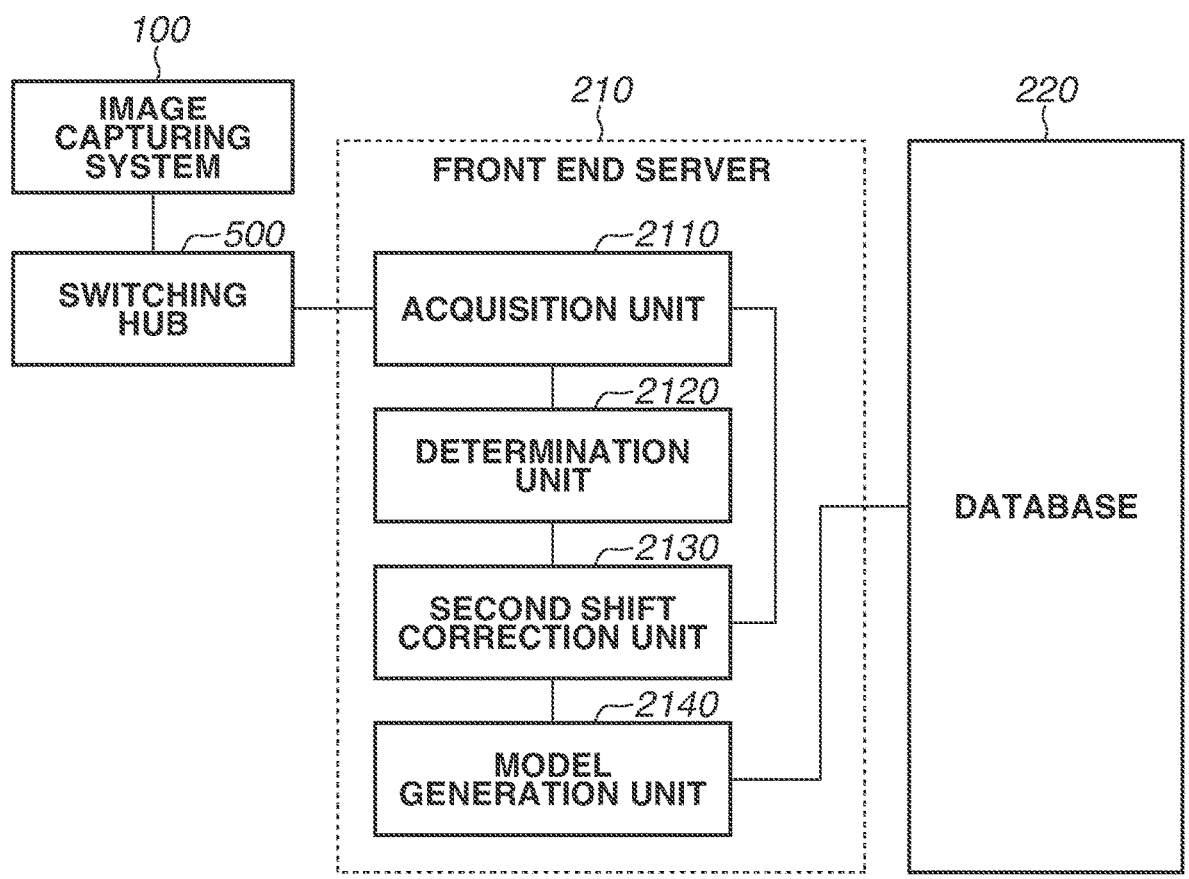
FIG. 3 is a diagram illustrating a functional configuration of a front end server.

Next, a functional configuration of the front end server 210 will be described below with reference to FIG. 3. The front end server 210 includes an acquisition unit 2110, a determination unit 2120, a second shift correction unit 2130, and a model generation unit 2140. The acquisition unit 2110 acquires information, transmitted from the image processing apparatus 120 of the image capturing system 100 via the switching hub 500, such as the image capturing parameter, the image data, the reliability information, and the feature point information. While only one image capturing system 100 is illustrated in FIG. 3, image data, reliability information, and feature point information are transmitted from each of the plurality of image capturing systems 100 as illustrated in FIG. 1. The acquisition unit 2110 transmits the image capturing parameter to the second shift correction unit 2130 and transmits the plurality of pieces of image data and the feature point information that are acquired to the determination unit 2120.

The determination unit 2120 determines target image data as a target of second correction processing that is performed by the second shift correction unit 2130, which will be described below, and reference image data as a reference, based on the reliability information transmitted from the acquisition unit 2110. In the present exemplary embodiment, image data having the associated reliability information higher than a predetermined threshold value among the plurality of pieces of image data transmitted from the acquisition unit 2110 is determined as reference image data. A method of determining reference image data is not limited to the above-described method and, for example, a predetermined number of pieces of reference image data can be determined in decreasing order of reliability. In another example, image data based on the image capturing performed by the plurality of image capturing apparatuses 110 on an image capturing range that covers the entire image capturing region 1 among the image data with a higher reliability than the predetermined threshold value can be selected as reference image data.

Image data having the associated reliability information lower than the predetermined threshold value is determined as target image data from among the plurality of pieces of image data transmitted from the acquisition unit 2110. A method of determining target image data is not limited to the above-described method and, for example, a predetermined number of pieces of target image data can be determined in increasing order of reliability. Further, for example, all the pieces of image data that are not selected as reference image data among the plurality of pieces of image data can be selected as target image data. As described above, in the present exemplary embodiment, image data having a higher reliability than the reliability of target image data is selected as reference image data.

The number of image data selected as reference image data can be one or more than one. It should be noted that the second shift correction unit 2130 described below associates a feature point on the reference image data with a feature point on the target image data and corrects the target image data based on the associated feature points. In this operation, if reference image data that contains the feature point corresponding to the feature point on the target image data based on the same position as the position in the image capturing region 1 is not selected, the target image data may not be corrected as appropriate by the second shift correction unit 2130. Thus, for example, the plurality of pieces of reference image data that covers the entire image capturing region 1 is selected to produce an advantage that the associating with the feature point on the target image data is performed as appropriate. Image data based on the image capturing by the image capturing apparatus 110 adjacent to the image capturing apparatus 110 corresponding to the target image data or image data based on the image capturing by the image capturing apparatus 110 to which the same focused region as that of the image capturing apparatus 110 corresponding to the target image data is set can be selected as reference image data.

The determination unit 2120 transmits the plurality of pieces of image data transmitted from the acquisition unit 2110 and information for notification of the determined reference image data and the determined target image data to the second shift correction unit 2130.

The second shift correction unit 2130 and the model generation unit 2140 each perform predetermined image processing based on the image data acquired by the acquisition unit 2110. The image processing performed by each processing unit will be described below.

The second shift correction unit 2130 performs correction processing (hereinafter, referred to as "second correction processing") to correct the target image data based on information about the feature points on the reference image data and the target image data and the image capturing parameter of the image capturing apparatus 110 corresponding to the reference image data. Like a shift corrected by the first correction processing, a shift corrected by the second correction processing is a shift that occurs due to a shift in image capturing position, a shift in image capturing direction, and a zoom shift. The second shift correction unit 2130 corrects a shift between pieces of image data acquired based on the image capturing by the different image capturing apparatuses 110 at a predetermined time point. Details of the second correction processing will be described below.

The second shift correction unit 2130 associates feature points based on information about feature points associated with the plurality of pieces of image data acquired by the acquisition unit 2110. In the present exemplary embodiment, the term "corresponding feature points" refers to feature points having feature information indicating substantially the same feature. However, since the image capturing parameters of the plurality of image capturing apparatuses 110 are different, features of feature points on the plurality of pieces of image data do not always correspond. Thus, the relationship between the image capturing parameters of the image capturing apparatuses 110 should also be taken into consideration in associating the feature points. For example, feature points that have substantially the same feature when the plurality of pieces of image data is projected onto the same two-dimensional coordinates based on at least one of the image capturing parameters of the image capturing apparatuses 110 corresponding to the respective pieces of image data are associated. Further, feature points can be associated by, for example, projecting a partial region containing the feature point on the target image data onto the two-dimensional coordinates on the reference image data using the image capturing parameter and then searching for the closest feature to the feature point contained in the deformed partial region. A partial region containing the feature point on the reference image data can be projected onto the two-dimensional coordinates on the target image data. Further, image data or a partial region of image data can be deformed instead of being projected. This method is also applicable to other local features (e.g., line, region, and patch).

As described above, in a case where a plurality of feature points has a similar feature, associating feature points based on the features of the feature points may result in erroneous association. Thus, the second shift correction unit 2130 calculates an epipolar line based on, for example, the feature point on the reference image data and the image capturing parameter corresponding to the reference image data and projects the calculated epipolar line onto another piece of image data. This identifies a feature point having a similar feature and having a short distance between the epipolar line and the feature point on the image data. The identified feature point is determined as a feature point corresponding to the feature point on the reference image data to prevent erroneous association.

The second shift correction unit 2130 performs shift determination by performing the following processing using a three-dimensional position of the feature point. The second shift correction unit 2130 calculates three-dimensional coordinates of the feature point on the reference image data and three-dimensional coordinates of the feature point on the target image data that has a feature corresponding to the feature of the feature point on the reference image data, based on the result of the feature point association. The three-dimensional coordinates of the feature point in the image capturing region 1 are calculated by projecting the feature point onto a three-dimensional space or by a method using the principle of triangulation, based on the two-dimensional coordinates of the feature point on the image data and the image capturing parameter corresponding to the image data. In this operation, the plurality of pieces of image data and the image capturing parameters corresponding to the respective pieces of image data are used, and therefore the three-dimensional coordinates are calculated with greater accurately.

Since the calculated three-dimensional coordinates of the feature point on the reference image data and the three-dimensional coordinates of the feature point on the target image data are associated feature points, unless there is no change in the state of the image capturing apparatus 110 after the calibration, the three-dimensional coordinates are expected to correspond. However, in a case where there is a change in the state of at least one of the image capturing apparatus 110 corresponding to the reference image data and the image capturing apparatus 110 corresponding to the target image data, the three-dimensional coordinates may be shifted. Thus, the second shift correction unit 2130 modifies the target image data in such a manner that the three-dimensional coordinates of the feature point on the image data (reference image data) having high reliability and the three-dimensional coordinates of the feature point on the image data (target image data) having low reliability correspond to each other.

The second shift correction unit 2130 determines that there is a shift based on a difference between the calculated three-dimensional coordinates on the reference image data and the three-dimensional coordinates of the feature point on the target image data. In a case where the second shift correction unit 2130 determines that there is a shift, the image capturing parameter after the change in the state of the image capturing apparatus 110 corresponding to the target image data is calculated using the three-dimensional coor-dinates of the feature point on the reference image data. In this operation, the image capturing parameter after the change in the state of the image capturing apparatus 110 corresponding to the target image data is calculated by solving the P versus NP problem using the two-dimensional coordinates of the feature point on the target image data with the three-dimensional coordinates of the feature point on the reference image data being a reference. The second shift correction unit 2130 calculates a homography matrix H, which indicates a change in the image capturing state of the image capturing apparatus 110 corresponding to the target image data, using the calculated image capturing parameter. The homography matrix H is approximated using the following formula 1:

$$H = (K \cdot ([R\ t]) \cdot (K \cdot [R't])^+ \quad (1),$$

where K, R, and t are each information contained in the image capturing parameter. K is a matrix of three rows and three columns that represents a parameter indicating the focal length of the lens and the lens distortion, R is a matrix of three rows and three columns that represents the orientation of the image capturing apparatus 110, and t is a matrix of three rows and one column that represents the position of the image capturing apparatus 110. R and t are parameters acquired during calibration, and R' and t' are parameters estimated after the change in the state of the image capturing apparatus 110. The symbol "+" represents a pseudo inverse matrix.

The target image data is homographically transformed using the homography matrix H approximated based on Formula 1, and thus a shift between the three-dimensional coordinates of the feature point on the target image data after the homographic transformation and the three-dimensional coordinates of the feature point on the reference image data is corrected. In a case where there is a plurality of pieces of target image data, the homography matrix H is acquired for each piece of target image data, and the target image data is modified. The processing in this operation can be performed sequentially on each piece of target image data or can be performed simultaneously. The second correction processing performed by the second shift correction unit 2130 is described above.

The model generation unit 2140 generates shape data indicating the shape of the object in the image capturing region 1 based on the image capturing parameter and the plurality of pieces of image data including the corrected target image data acquired by the second correction processing by the second shift correction unit 2130. The model generation unit 2140 in the present exemplary embodiment generates a three-dimensional model representing the three-dimensional shape of the object using a method, for example, a shape-from-silhouette method, which is a publicly-known technique. Shape data to be generated is not limited to three-dimensional models. For example, shape data may be generated based on image-based rendering. The model generation unit 2140 transmits the generated object shape data as image data to the database 220. Image data containing the transmitted shape data is used in rendering processing by the back end server 230 to generate a virtual point-of-view image.

The functional configuration of the front end server 210 is described above. In the first correction processing by the image processing apparatus 120, a shift between the captured images is corrected based on the plurality of captured images that is acquired by the same image capturing apparatus 110 by performing image capturing at a plurality of different time points. The processing is performed using the feature point based on the object that does not change in position at the plurality of different time points, and therefore the shift is corrected. However, depending on the installation site or installation situation of the plurality of image capturing apparatuses 110, there may be the image capturing apparatus 110 in which a feature point based on an object that does not change in position is not sufficiently extracted. Meanwhile, the front end server 210 performs the second correction processing to correct a shift between the image data based on the corresponding feature points on the plurality of pieces of image data acquired by the image capturing performed at a predetermined time point by the different image capturing apparatuses 110. Thus, if feature points based on the same object are extracted among the image capturing apparatus 110, a shift is corrected even in a case where the object is a moving object. This produces an advantage that image data from which sufficient feature points based on an object that does not change in position are not extracted and on which the first correction processing is not performed as appropriate is also corrected by the second correction processing. Further, the front end server 210 corrects a shift between the image data by the above-described method even in a case where each of the plurality of image capturing apparatuses 110 is affected by a different shake or a different zoom shift occurs in each of the plurality of image capturing apparatuses 110.

FIGS. 4A and 4B are diagrams illustrating a process performed by the image processing apparatus 120 and a process performed by the front end server 210. The CPUs of the image processing apparatus 120 and the front end server 210 read a program stored on the ROMs or the auxiliary storage apparatuses and execute the read program to perform the processes illustrated in FIGS. 4A and 4B. Hereinafter, each processing step will be referred to simply as S.

First, a process that is performed by the image processing apparatus 120 will be described below with reference to FIG. 4A. In a case where the image capturing apparatus control unit 1220 receives an instruction to activate the information processing system 10, the process is started. In step S1010, the image capturing apparatus control unit 1220 sets initial settings of the image processing apparatus 120. In setting the initial settings, the calibration processing to acquire the image capturing parameter of the image capturing apparatus 110 is performed, and the reference captured image for use in the first correction processing performed by the first shift correction unit 1202 is acquired. The acquired image capturing parameter and the acquired reference captured image are stored on an auxiliary storage apparatus of the image processing apparatus 120. A timing to acquire the reference captured image is not limited to the timing of the initial setting, and the reference captured image can be acquired during a plurality of times of image capturing by the image capturing apparatus 110 in step S1020.

In step S1020, the image capturing apparatus control unit 1220 acquires information about an image capturing instruction transmitted from the control station 300 and controls the image capturing apparatus 110 based on the acquired information. The image acquisition unit 1201 acquires a captured image acquired by the image capturing performed by the image capturing apparatus 110 under the control by the image capturing apparatus control unit 1220. In step S1030, the first shift correction unit 1202 performs the first correction processing to correct the captured image acquired by the image acquisition unit 1201. First, the feature extraction unit 1204 extracts a plurality of feature points from the captured image acquired by the image acquisition unit 1201. The feature extraction unit 1204 transmits position information and feature information about each extracted feature point to the first shift correction unit 1202. The first shift correction unit 1202 determines a shift amount indicating the magnitude of the shift based on a shift of coordinates on the captured image between the feature points on the captured image acquired from the image acquisition unit 1201 and feature points on the reference captured image that correspond to the feature points on the captured image. The first shift correction unit 1202 performs processing as the first correction processing to modify the captured image in such a manner that the captured image is translated or enlarged/reduced based on the determined shift amount, and the first shift correction unit 1202 acquires corrected image data. The first shift correction unit 1202 transmits the acquired image data to the foreground extraction unit 1203 and the feature extraction unit 1204.

In step S1040, the first shift correction unit 1202 acquires reliability information indicating the reliability of the first correction processing. For example, the first shift correction unit 1202 calculates a shift amount of each feature point based on the corrected captured image and the captured image before the correction. The first shift correction unit 1202 acquires the calculated shift amounts as reliability information and transmits the reliability information to the transmission unit 1210.

In step S1050, the foreground extraction unit 1203 generates a foreground image by extracting a foreground region from the image data transmitted from the first shift correction unit 1202. The foreground extraction unit 1203, for example, generates a background image corresponding to a region other than the foreground region in advance and extracts the foreground region by calculating the difference between the background image and the captured image. The foreground extraction unit 1203 transmits the foreground image based on the extracted foreground region as image data to the transmission unit 1210.

In step S1060, the feature extraction unit 1204 extracts a plurality of feature points for use in the second correction processing from the image data acquired from the first shift correction unit 1202. A method similar to that in step S1030 is used to extract the feature points. The feature points extracted in this operation can include a feature point based on an object that changes in position at different time points. The feature extraction unit 1204 transmits position information and feature information about each feature point to the transmission unit 1210.

In step S1070, the transmission unit 1210 transmits the image data containing the foreground image transmitted from the foreground extraction unit 1203 to the server system 200. The transmission unit 1210 also transmits the image capturing parameter of the image capturing apparatus 110, the reliability information about the first correction processing, and the feature point information about the image data to the server system 200. Then, the series of processing from the initial setting to the image data transmission by the image processing apparatus 120 is ended. In a case where the image capturing apparatus 110 continuously performs image capturing, steps S1020 to S1070 can be repeated.

Next, a process that is performed by the front end server 210 will be described below with reference to FIG. 4B. In a case where the front end server 210 receives an instruction to start processing from the control station 300, the following process is performed. In step S1110, the acquisition unit 2110 acquires the image capturing parameter transmitted from the image processing apparatus 120 and initializes the front end server 210 by setting a setting in such a manner that the acquired image capturing parameter is used in step S1120 and thereafter. While the image capturing parameter is acquired from the image processing apparatus 120 in step S1110 in the present exemplary embodiment, the present exemplary embodiment is not limited to those described above. For example, the image capturing parameter can be stored in advance on an auxiliary storage apparatus before the process illustrated in FIG. 4B, and the stored image capturing parameter can be read.

In step S1120, the acquisition unit 2110 acquires the image data transmitted from the image processing apparatus 120. Further, the acquisition unit 2110 acquires the reliability information and the feature point information. In step S1130, the determination unit 2120 determines target image data as a target of the second correction processing performed by the second shift correction unit 2130, which will be described below, and reference image data as a reference, based on the reliability information transmitted from the acquisition unit 2110. For example, the determination unit 2120 determines image data having the associated reliability information higher than the predetermined threshold value as reference image data and determines image data having the associated reliability information lower than the predetermined threshold value as target image data, from among the plurality of pieces of image data.

In step S1140, the second shift correction unit 2130 performs the second correction processing to correct the target image data based on the information about the feature points on the reference image data and the target image data and the image capturing parameter of the image capturing apparatus 110 corresponding to the reference image data. Details of the processing in step S1140 will be described below with reference to FIG. 5. In step S1141, the second shift correction unit 2130 associates the feature points based on the feature point information associated with the plurality of pieces of image data acquired by the acquisition unit 2110. For example, the second shift correction unit 2130 searches for the feature points having substantially the same feature based on the feature information to associate the feature points.

In step S1142, the second shift correction unit 2130 calculates three-dimensional coordinates of the feature points on the reference image data and three-dimensional coordinates of the feature points on the target image data that correspond to the feature points on the reference image data, based on the result of associating the feature points. The three-dimensional coordinates of the feature points in the image capturing region 1 are calculated by projecting the feature points onto a three-dimensional space or by a method using the principle of triangulation, based on the two-dimensional coordinates of the feature points on the image data and the image capturing parameter corresponding to the image data.

In step S1143, the second shift correction unit 2130 determines that there is a shift based on a difference between the calculated three-dimensional coordinates on the reference image data and the three-dimensional coordinates of the feature points on the target image data. In step S1144, in a case where the second shift correction unit 2130 determines that there is a shift, the image capturing parameter after the change in the state of the image capturing apparatus 110 corresponding to the target image data is calculated by solving the P versus NP problem using the three-dimensional coordinates of the feature points on the reference image data. The second shift correction unit 2130 calculates the homography matrix H, which indicates a change in the image capturing state of the image capturing apparatus 110 corresponding to the target image data, using the calculated image capturing parameter. In step S1145, the second shift correction unit 2130 homographically transforms the target image data using the calculated homography matrix H to acquire image data with the shift corrected. Further, the second shift correction unit 2130 transmits the acquired image data to the model generation unit 2140. In a case where there is a plurality of pieces of target image data, steps S1143 to S1145 are repeated until all the pieces of target image data are processed.

Back to FIG. 4B, in step S1150, the model generation unit 2140 generates shape data indicating the shape of the object in the image capturing region 1 based on the image capturing parameter and the plurality of pieces of image data including the corrected target image data. For example, the model generation unit 2140 generates a three-dimensional model of the object based on the foreground image using a method, such as a shape-from-silhouette method, which is a publicly-known technique. The model generation unit 2140 transmits the generated shape data as image data to the database 220. Then, the process by the front end server 210 is ended.

(Modified Example of First Exemplary Embodiment)

While the example in which target image data is modified using the homography matrix H in the second correction processing is described in the first exemplary embodiment, the first exemplary embodiment is not limited to those described above. The front end server 210 can perform correction to change the image capturing parameter of the image capturing apparatus 110 corresponding to the target image data to the image capturing parameter after the change in the state of the image capturing apparatus 110 that is estimated by the second shift correction unit 2130 without calculating the homography matrix H. In this operation, the model generation unit 2140 generates shape data based on the changed image capturing parameter and the image data (foreground image). The method of correcting the image capturing parameter is effective in a case where, for example, the position and orientation of the image capturing apparatus 110 are changed by shaking the image capturing apparatus 110 and the changed state continues. In this case, the second correction processing after the state is changed is reduced by correcting the image capturing parameter to the image capturing parameter corresponding to the image capturing apparatus 110 after the state is changed.

Further, both the target image data and the image capturing parameter of the image capturing apparatus 110 that correspond to the target image data can be corrected. In this case, for example, a shift between the positions of the feature points on the reference image data and the positions of the feature points on the target image data is divided into a plurality of direction components, and one of the target image data and the image capturing parameter of the image capturing apparatus 110 that corresponds to the target image data is corrected for each component.

While the case where the reliability information is acquired based on the accuracy of the first correction processing is described above, this is not a limiting case. In the second correction processing, the correction processing is performed based on the associated feature points, so that image data that contains many feature points is determined as reference image data. Thus, the accuracy of the correction in the second correction processing may increase. Thus, for example, when the feature extraction unit 1204 extracts feature points from the image data acquired in the first correction processing, the reliability information can be determined based on the number of extracted feature points. Reliability information can also be determined based on the focal length of the lens of the image capturing apparatus 110 since, as the angle of view of the image capturing apparatus 110 is increased, captured images are expected to contain more feature points. Reliability information can also be determined based on the position of the image capturing apparatus 110, since captured images acquired by the image capturing apparatus 110 that is disposed at a position where the image capturing apparatus 110 is less likely to be affected by shakes are less likely to be shifted. As described above, the front end server 210 can select reference image data based on the focal length and position of the image capturing apparatus 110. The image capturing apparatus 110 that is to be used to acquire reference image data can also be designated by user input.

While the second shift correction unit 2130 in the first exemplary embodiment determines a difference between the three-dimensional coordinates on the reference image data and the three-dimensional coordinates of the feature points on the target image data as a shift, the following method can also be used to determine a shift. For example, the second shift correction unit 2130 projects the three-dimensional coordinates of the feature points on the reference image data onto the target image data using the image capturing parameter of the image capturing apparatus 110 that corresponds to the target image data, and the second shift correction unit 2130 performs shift determination based on a difference between the two-dimensional coordinates of the feature points. Alternatively, for example, the second shift correction unit 2130 projects the three-dimensional coordinates of the feature points on the target image data onto the reference image data using the image capturing parameter of the image capturing apparatus 110 that corresponds to the reference image data, and the second shift correction unit 2130 performs shift determination based on a difference between the two-dimensional coordinates of the feature points. As described above, various methods can be used to determine a shift.

The second shift correction unit 2130 can also modify the target image data in such a manner that the distance between each feature point and the corresponding epipolar line is minimized after projecting the epipolar line based on the feature points on the reference image data onto the target image data. Specifically, the second shift correction unit 2130 can also perform shift correction by correcting a shift between the positions of the feature points in a case where the feature points on the reference image data are projected onto the target image data using the image capturing parameter and the positions of the corresponding feature points on the target image. Similarly, the second shift correction unit 2130 can also perform shift correction by correcting a shift between the positions of the feature points in a case where the feature points on the target image data are projected onto the reference image data using the image capturing parameter and the positions of the corresponding feature points on the reference image.

In a case where it is known that, for example, the image capturing apparatus 110 will be shaken at regular intervals, the first shift correction unit 1202 and the second shift correction unit 2130 can determine a correction amount of image data to reduce shifts caused by the shakes, based on the period and magnitude of the shakes. As described above, once a correction amount is determined, image data is corrected to reduce shifts with respect to the same shake. In this case, the first shift correction unit 1202 and the second shift correction unit 2130 can include a function of identifying the period and magnitude of shakes based on shifts.

The first shift correction unit 1202 can be included in the front end server 210. In this case, the front end server 210 stores the reference captured image in advance on an auxiliary storage apparatus or the like and acquires a captured image from the image processing apparatus 120 to perform the first correction processing. In this case, at least one of the feature extraction unit 1204 and the foreground extraction unit 1203 can be included in the front end server 210.

While, in the present exemplary embodiment, the first correction processing and the second correction processing are performed each time a captured image is transmitted from the image capturing apparatus 110, the present exemplary embodiment is not limited to those described above. For example, the image capturing apparatus 110 can be provided with a shake detection sensor, and only in a case where a shake greater than a predetermined threshold value is detected, at least one of the first correction processing and the second correction processing can be performed. Each of the first correction processing and the second correction processing can be turned on/off based on a user operation.

While, in the present exemplary embodiment, the case were it is determined that there is a shift in step S1143 is mainly described, the second correction processing can be skipped in a case where it is determined that there is not a shift. In the shift determination in step S1143, it can be determined that there is a shift in a case where the magnitude of the shift is greater than or equal to a predetermined threshold value. Thus, in a case where a shift is small, it is determined that there is not a shift, and the second correction processing is skipped, and therefore an advantage such as a processing load reduction is produced.

With the configuration described above, the front end server 210 of the information processing system 10 corrects a shift between image data that is caused by a change in the state of the image capturing apparatus 110, and therefore an effect of the change in the state of the image capturing apparatus 110 is reduced. In this operation, the front end server 210 corrects at least one of the target image data and the image capturing parameter of the image capturing apparatus 110 that corresponds to the target image data.

Second Exemplary Embodiment

In the present exemplary embodiment, an image processing system including an image capturing apparatus (hereinafter, also referred to as "image capturing apparatus for correction") for acquiring a captured image for use in correction processing in addition to the image capturing apparatus 110 will be described below.

Figure 6:
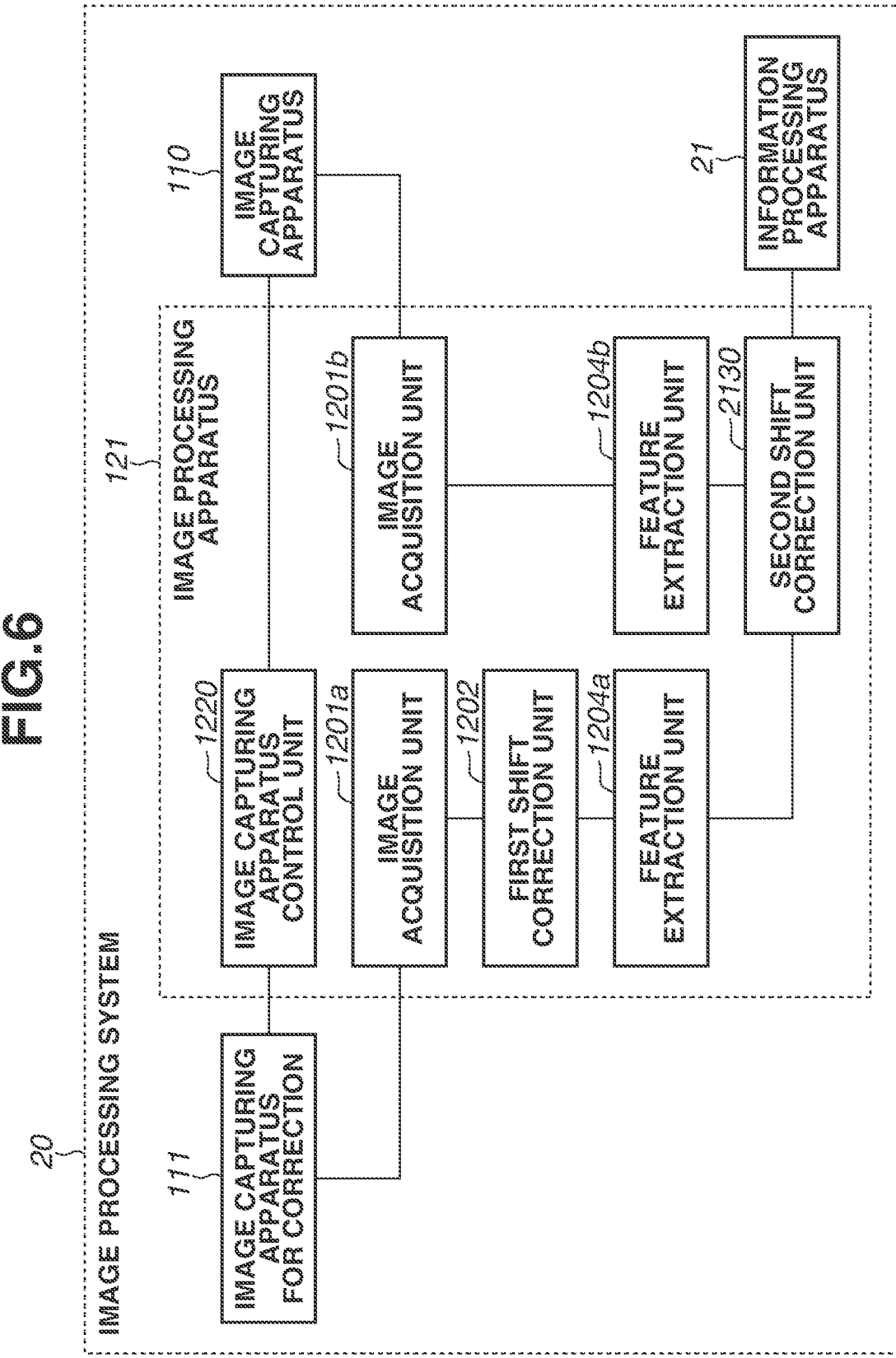
FIG. 6 is a diagram illustrating a configuration of an information processing system including an image capturing apparatus for correction.

FIG. 6 is a diagram illustrating a configuration of an image processing system 20. The image processing system 20 includes the image capturing apparatus 110, an image capturing apparatus 111 for correction, and an image processing apparatus 121. The image processing apparatus 121 includes the image acquisition unit 1201, the first shift correction unit 1202, the feature extraction unit 1204, and the second shift correction unit 2130. While the image acquisition unit 1201 and the feature extraction unit 1204 each include two processing units, one for processing captured images from the image capturing apparatus 111 and the other for processing captured images from the image capturing apparatus 110 in FIG. 6 for convenience of description, the two processing units can be a single processing unit. The processing units that have similar functions to those of the information processing system 10 in the first exemplary embodiment are given the same reference numerals. A hardware configuration of the image processing apparatus 121 is similar to that of the image processing apparatus 120 in the first exemplary embodiment, so that redundant descriptions thereof are omitted.

The image capturing apparatus 111 for correction is set to have a wider angle of view than the angle of view of the image capturing apparatus 110 to capture sufficient feature points for use in the second correction processing in captured images. The image capturing apparatus 111 for correction transmits an acquired captured image to the image processing apparatus 120. The image capturing apparatus control unit 1220 controls the image capturing apparatus 111 for correction and the image capturing apparatus 110 based on an instruction from the control station 300 or user input. In this operation, the image capturing apparatus 111 for correction and the image capturing apparatus 110 perform image capturing at synchronized image capturing time points.

The image acquisition unit 1201a acquires the captured image from the image capturing apparatus 111 for correction and transmits the captured image to the first shift correction unit 1202. The image acquisition unit 1201b acquires a captured image from the image capturing apparatus 110 and supplies the captured image to the feature extraction unit 1204b. The first shift correction unit 1202 performs the first correction processing based on the captured image transmitted from the image acquisition unit 1201a and the reference captured image and acquires corrected image data. The first correction processing method and the reference captured image acquisition method are similar to those in the first exemplary embodiment.

The feature extraction unit 1204a extracts a feature point from the image data acquired by the first shift correction unit 1202 and transmits feature point information to the second shift correction unit 2130. The feature extraction unit 1204b extracts a feature point from the captured image transmitted from the image acquisition unit 1201b and transmits feature point information to the second shift correction unit 2130. The feature point extraction method is similar to that in the first exemplary embodiment. The second shift correction unit 2130 associates the feature points based on the feature point information transmitted from the feature extraction unit 1204a and the feature extraction unit 1204b and determines a shift amount. The second shift correction unit 2130 performs correction by modifying the captured image acquired from the image capturing apparatus 110, based on the determined shift amount to reduce the shift amount. Specifically, the second shift correction unit 2130 according to the present exemplary embodiment performs the second correction processing using image data based on the image capturing by the image capturing apparatus 111 for correction as reference image data and the captured image based on the image capturing by the image capturing apparatus 110 as target image data. The second correction processing method is similar to that in the first exemplary embodiment. The second shift correction unit 2130 transmits image data acquired by performing the second correction processing to another information processing apparatus 21. The information processing apparatus 21 is, for example, the front end server 210. The first shift correction unit 1202 for the image capturing apparatus 110 can also be prepared.

With the above-described configuration, for example, even in a case where each of the plurality of image capturing apparatuses 110 captures telephoto images of a narrow region, and therefore it is difficult to associate feature points of captured images, the feature points are associated using a captured image acquired from the image capturing apparatus 111 for correction that captures images of a wider range.

While, in the present exemplary embodiment, the image capturing apparatus 111 for correction is used only to correct captured images acquired from the image capturing apparatus 110, captured images acquired from the image capturing apparatus 111 for correction can be used in generating a foreground image or shape data. In a case where there is a plurality of image processing apparatuses 120, a single image capturing apparatus 111 for correction can transmit captured images to each image processing apparatus 120, or two or more image capturing apparatuses 111 for correction can each transmit captured images to a predetermined image processing apparatus 120. As described above, any desired number of image capturing apparatuses 111 for correction can be included.

Other Exemplary Embodiment

While the example in which captured images acquired by the plurality of image capturing apparatuses 110 are used in generating a virtual point-of-view image is described in the exemplary embodiments, this is not a limiting example, and a plurality of captured images can be used in generating image content other than a virtual point-of-view image. For example, in a case where a panoramic image is to be generated as image content, use of the target image data and/or the image capturing parameter corrected by the above-described method reduces position shifts in combining image data. Further, for example, in a case where image content for analyzing an orientation and movement of a subject (e.g., athlete) and image content for use in making judgements in sports are to be generated, a similar method is applicable. Use of the target image data and/or the image capturing parameter corrected by the above-described method realizes high accuracy in analysis and judgement.

With the present disclosure, an effect of a change in a state of an image capturing apparatus on the quality of image content in various situations is reduced.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-018275, filed Feb. 5, 2020, which is hereby incorporated by reference herein in its entirety.

What is claimed is:

1. An information processing apparatus comprising one or more memories storing instructions; and one or more processors that execute the instructions to:
acquire a plurality of images to be used in generating image content based on capturing an image of an image capturing region at a predetermined time point from different directions by a plurality of image capturing apparatuses;
acquire a plurality of pieces of image capturing information including information representing at least one of positions and orientations of the plurality of image capturing apparatuses corresponding to the plurality of images; and
correct a shift between a first three-dimensional position in the image capturing region specified based on a position of a first feature point on a first image among the plurality of images and the image capturing information about a first image capturing apparatus among the plurality of image capturing apparatuses that corresponds to the first image and a second three-dimensional position in the image capturing region specified based on a position of a second feature point corresponding to the first feature point on a second image among the plurality of images and the image capturing information about a second image capturing apparatus among the plurality of image capturing apparatuses that corresponds to the second image,
wherein the plurality of images are respectively acquired by the plurality of image capturing apparatuses at a specific time point, wherein each image of the plurality of images acquired by each image capturing apparatus of the plurality of image capturing apparatuses has undergone a correction to correct a shift between a feature point in the image and a corresponding feature point in a reference image acquired by the image capturing apparatus at a different time point from the specific time point,
wherein the first image is acquired by the first image capturing apparatus at the specific time point and has undergone a correction to correct a shift between a feature point in the first image and a corresponding feature point in a reference image acquired by the first image capturing apparatus at a different time point from the specific time point, and
the second image is acquired by the second image capturing apparatus at the specific time point and has undergone a correction to correct a shift between a feature point in the second image and a corresponding feature point in a reference image acquired by the second image capturing apparatus at a different time point from the specific time point,
wherein the one or more processors execute the instructions to:
select the first image and the second image from the plurality of images based on reliability of the correction on each image to correct the shift between the feature point in the image and the corresponding feature point in the reference image, such that the reliability of the correction on the first image is higher than the reliability of the correction on the second image; and
correct the image capturing information about the second image capturing apparatus and/or the second image based on the first image to correct the shift between the first three-dimensional position and the second three-dimensional position.

2. The information processing apparatus according to claim 1, wherein the one or more processors execute the instructions to correct the shift based on the position of the second feature point on the second image and a position on the second image that is identified by projecting the first feature point onto the second image based on the image capturing information about the image capturing apparatus that corresponds to the first image and the image capturing information about the image capturing apparatus that corresponds to the second image.

3. The information processing apparatus according to claim 1, wherein the one or more processors execute the instructions to correct the shift based on the first three-dimensional position, the position of the second feature point on the second image, and the image capturing information about the image capturing apparatus that corresponds to the second image.

4. The information processing apparatus according to claim 1, wherein the one or more processors execute the instructions to correct the shift by modifying the second image.

5. The information processing apparatus according to claim 1, wherein the one or more processors execute the instructions to correct the shift by changing the image capturing information about the image capturing apparatus that corresponds to the second image.

6. The information processing apparatus according to claim 1, wherein the plurality of images include an image acquired by performing correction processing to correct a shift between a position of a third feature point on a third image acquired based on capturing of an image of the image capturing region at the predetermined time point by the image capturing apparatus and a position of a fourth feature point, corresponding to the third feature point, on a fourth image acquired based on capturing of an image of the image capturing region at another time point different from the predetermined time point by the image capturing apparatus.

7. The information processing apparatus according to claim 1, wherein the one or more processors execute the instructions to select the first image from among the plurality of images based on information indicating reliability of the correction processing.

8. The information processing apparatus according to claim 7, wherein, the one or more processors execute the instructions to, based on the information indicating reliability of the correction processing select an image corresponding to information indicating reliability of the correction processing that is higher than a predetermined threshold value, as the first image from among the plurality of images.

9. The information processing apparatus according to claim 7, wherein, the one or more processors execute the instructions to, based on the information indicating reliability of the correction processing, select an image corresponding to information indicating reliability of the correction processing that is higher than reliability of the correction processing on another image acquired by performing the correction processing, as the first image from among the plurality of images.

10. The information processing apparatus according to claim 7,
wherein the information indicating reliability of the correction processing is determined based on a difference between a position of a feature point on an image that is acquired by performing the correction processing and the position of the fourth feature point on the fourth image.

11. The information processing apparatus according to claim 1, wherein a focal length of the image capturing apparatus that corresponds to the first image is less than a focal length of the image capturing apparatus that corresponds to the second image.

12. The information processing apparatus according to claim 1, wherein the second feature point is a feature point having the same feature as a feature of the first feature point in a case where the first image and the second image are projected onto the same two-dimensional coordinate based on the image capturing information about the image capturing apparatus that corresponds to the first image and the image capturing information about the image capturing apparatus that corresponds to the second image.

13. The information processing apparatus according to claim 1, wherein the one or more processors execute the instructions to correct the shift in a case where at least one of the position and the orientation of the image capturing apparatus is changed by a shake of the image capturing apparatus.

14. The information processing apparatus according to claim 1, wherein the one or more processors execute the instructions to generate shape data contained in the image content and representing a shape of an object in the image capturing region, based on the plurality of images and the plurality of pieces of image capturing information.

15. The information processing apparatus according to claim 14, wherein the one or more processors execute the instructions to
modify the second image, and
generate the shape data based on the plurality of images including the modified second image and the plurality of pieces of image capturing information.

16. The information processing apparatus according to claim 15, wherein the one or more processors execute the instructions to
change the image capturing information about the image capturing apparatus that corresponds to the second image, and
generate the shape data based on the plurality of images and the plurality of pieces of image capturing information including the changed image capturing information about the image capturing apparatus that corresponds to the second image.

17. The information processing apparatus according to claim 1, wherein each of the first feature point and the second feature point is a feature point based on an object that changes in position at a different time point in the image capturing region.

18. The information processing apparatus according to claim 1, wherein the reliability of the correction to correct the shift between the feature point in the image and the corresponding feature point in the reference image indicates a remaining amount of shift between the feature point in the image and the corresponding feature point in the reference image after the correction.

19. An information processing method comprising:
acquiring a plurality of images to be used in generating image content based on capturing an image of an image capturing region at a predetermined time point from different directions by a plurality of image capturing apparatuses;
acquiring a plurality of pieces of image capturing information including information representing at least one of positions and orientations of the plurality of image capturing apparatuses corresponding to the plurality of images; and
correcting a shift between a first three-dimensional position in the image capturing region specified based on a position of a first feature point on a first image among the plurality of images and the image capturing information about a first image capturing apparatus among the plurality of image capturing apparatuses that corresponds to the first image and a second three-dimensional position in the image capturing region specified based on a position of a second feature point corresponding to the first feature point on a second image among the plurality of images and the image capturing information about a second image capturing apparatus among the plurality of image capturing apparatuses that corresponds to the second image,
wherein the plurality of images are respectively acquired by the plurality of image capturing apparatuses at a specific time point, wherein each image of the plurality of images acquired by each image capturing apparatus of the plurality of image capturing apparatuses has undergone a correction to correct a shift between a feature point in the image and a corresponding feature point in a reference image acquired by the image capturing apparatus at a different time point from the specific time point,
wherein the first image is acquired by the first image capturing apparatus at a specific time point and has undergone a correction to correct a shift between a feature point in the first image and a corresponding feature point in a reference image acquired by the first image capturing apparatus at a different time point from the specific time point, and
the second image is acquired by the second image capturing apparatus at the specific time point and has undergone a correction to correct a shift between a feature point in the second image and a corresponding feature point in a reference image acquired by the second image capturing apparatus at a different time point from the specific time point,
wherein the method further comprises:
selecting the first image and the second image from the plurality of images based on reliability of the correction on each image to correct the shift between the feature point in the image and the corresponding feature point in the reference image, such that the reliability of the correction on the first image is higher than the reliability of the correction on the second image; and
correcting the image capturing information about the second image capturing apparatus and/or the second image based on the first image to correct the shift between the first three-dimensional position and the second three-dimensional position.

20. A non-transitory computer-readable storage medium storing a program for causing a computer to execute a method, the method comprising:
acquiring a plurality of images to be used in generating image content based on capturing an image of an image capturing region at a predetermined time point from different directions by a plurality of image capturing apparatuses;

acquiring a plurality of pieces of image capturing information including information representing at least one of positions and orientations of the plurality of image capturing apparatuses corresponding to the plurality of images and correcting a shift between a first three-dimensional position in the image capturing region specified based on a position of a first feature point on a first image among the plurality of images and the image capturing information about a first image capturing apparatus among the plurality of image capturing apparatuses that corresponds to the first image and a second three-dimensional position in the image capturing region specified based on a position of a second feature point corresponding to the first feature point on a second image among the plurality of images and the image capturing information about a second image capturing apparatus among the plurality of image capturing apparatuses that corresponds to the second image, wherein the plurality of images are respectively acquired by the plurality of image capturing apparatuses at a specific time point, wherein each image of the plurality of images acquired by each image capturing apparatus of the plurality of image capturing apparatuses has undergone a correction to correct a shift between a feature point in the image and a corresponding feature point in a reference image acquired by the image capturing apparatus at a different time point from the specific time point, wherein the first image is acquired by the first image capturing apparatus at a specific time point and has undergone a correction to correct a shift between a feature point in the first image and a corresponding feature point in a reference image acquired by the first image capturing apparatus at a different time point from the specific time point, and the second image is acquired by the second image capturing apparatus at the specific time point and has undergone a correction to correct a shift between a feature point in the second image and a corresponding feature point in a reference image acquired by the second image capturing apparatus at a different time point from the specific time point, wherein the method further comprises:

selecting the first image and the second image from the plurality of images based on reliability of the correction on each image to correct the shift between the feature point in the image and the corresponding feature point in the reference image, such that the reliability of the correction on the first image is higher than the reliability of the correction on the second image; and correcting the image capturing information about the second image capturing apparatus and/or the second image based on the first image to correct the shift between the first three-dimensional position and the second three-dimensional position.

* * * * *